(12) United States Patent
Burd

(10) Patent No.: US 9,987,902 B2
(45) Date of Patent: Jun. 5, 2018

(54) UNIVERSAL MODULAR DUCTING FOR CHILLED AIRCRAFT GALLEYS

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 372 days.

(21) Appl. No.: 14/467,583

(22) Filed: Aug. 25, 2014

(65) Prior Publication Data

US 2015/0059385 A1 Mar. 5, 2015

Related U.S. Application Data

(60) Provisional application No. 61/871,829, filed on Aug. 29, 2013.

(51) Int. Cl.
*B64D 13/00* (2006.01)
*B60H 1/00* (2006.01)
(Continued)

(52) U.S. Cl.
CPC ......... *B60H 1/00014* (2013.01); *B64D 11/04* (2013.01); *F24F 13/0263* (2013.01); *F25D 15/00* (2013.01); *B64D 2013/0629* (2013.01)

(58) Field of Classification Search
CPC .. B60H 1/0014; B60H 1/10021; B64D 11/04; B64D 2013/0629; F24F 13/0236;
(Continued)

(56) References Cited

U.S. PATENT DOCUMENTS 2,338,382 A 1/1944 Marlow
2,432,587 A 12/1947 Ramsey
(Continued)

FOREIGN PATENT DOCUMENTS

CN 101378959 A 3/2009
DE 19952523 A1 5/2001
(Continued)

OTHER PUBLICATIONS

International Search Report, dated Nov. 26, 2014, 5 pages, from PCT/US2014/053233.
(Continued)

*Primary Examiner* — Henry Crenshaw
(74) *Attorney, Agent, or Firm* — Donna P. Suchy

(57) ABSTRACT

A universal modular ducting apparatus for chilled aircraft galleys for either air over or air through carts has modular primary supply and return duct assemblies. Outlet port connection adapters are configured to connect chiller supply air duct outlet ports to either air through or air over configurations of aircraft galley food carts. The supply and return duct assemblies are internally insulated, and may be made from thermoformed plastic, prepreg, or a carbon fiber reinforced composite. Supply duct upper and lower portions may be connected by a connection adapter, and return duct upper and lower portions may be connected by a connection adapter, allowing the supply duct upper portion and the return duct upper portion to overlap.

20 Claims, 6 Drawing Sheets

(51) Int. Cl.
*B64D 11/04* (2006.01)
*F24F 13/02* (2006.01)
*F25D 15/00* (2006.01)
*B64D 13/06* (2006.01)

(58) Field of Classification Search
CPC . F24F 13/0263; F24F 13/0272; F25D 11/003; F25D 15/00; F25D 17/08; F25D 19/00; F25D 2317/067; F25D 2317/0671; F25D 2317/0672; F25D 2400/06
USPC .......................................................... 454/76
See application file for complete search history.

(56) References Cited

U.S. PATENT DOCUMENTS

| | | | |
|---|---|---|---|
| 5,346,127 A | 9/1994 | Creighton | |
| 5,778,942 A | 7/1998 | Jewell | |
| 6,298,912 B1 | 10/2001 | Rayburn et al. | |
| 6,405,977 B1* | 6/2002 | Ash | B64C 1/061 244/53 B |
| 7,231,778 B2 | 6/2007 | Rigney et al. | |
| 2010/0029190 A1* | 2/2010 | Dessero | B64D 13/08 454/76 |
| 2010/0050665 A1 | 3/2010 | Oswald et al. | |
| 2011/0056580 A1* | 3/2011 | Hoefle | F16L 9/14 138/111 |
| 2013/0047567 A1* | 2/2013 | Minoura | A01D 69/06 56/14.7 |
| 2013/0047657 A1 | 2/2013 | Oswald et al. | |
| 2013/0291852 A1* | 11/2013 | Boubeddi | A47J 39/006 126/20 |

FOREIGN PATENT DOCUMENTS

| | | | |
|---|---|---|---|
| EP | 0933850 A1 * | 8/1999 | .......... H02G 3/0608 |
| EP | 1836928 A2 | 9/2007 | |
| WO | WO 98/00662 A2 | 1/1998 | |

OTHER PUBLICATIONS

Office Action dated Dec. 20, 2016 in Canadian Patent Application No. 2,922,531.

Combined Office Action and Search Report dated Sep. 23, 2016 in Chinese Patent Application No. 201480047247.7 (with English language translation).

* cited by examiner

UNIVERSAL MODULAR DUCTING FOR CHILLED AIRCRAFT GALLEYS

CROSS-REFERENCES TO RELATED APPLICATIONS

This application is based upon and claims priority from U.S. Application No. 61/871,829, filed Aug. 29, 2013, incorporated by reference in its entirety.

BACKGROUND

This invention relates to transport aircraft galley systems, and more particularly, to systems to cool food carts prior to service by the cabin attendants.

Aircraft galley systems for modern transport aircraft incorporate food carts which are cooled to prevent food spoilage prior to use by the cabin attendants for distribution of food to passengers. These food carts are commonly interfaced with cold air supply systems in the galley designed to cool the interiors of the food carts. Galley cooling systems are typically mounted in a galley cabinet, so that cool air is discharged from the galley cooling system and circulates over or through galley food carts in a galley cabinet to return to the galley cooling system to again be cooled and discharged.

It would be desirable to provide an air distribution ductwork assembly suitable for use with either lateral or aft galleys commonly found in commercial passenger aircraft, that is capable of being used to chill galley food carts in such galley food cart bays having either an air over or air through configuration by simply changing connection adapters. It would be desirable to provide an air distribution ductwork assembly having a reduced cross-sectional area to increase space behind the galley. It would be desirable to provide an air distribution ductwork assembly that is modular, allowing a variety of chilled configurations to be employed, and that includes high performance integral insulation and provides efficient supply and return air balancing capability. The present invention meets these and other needs.

SUMMARY OF THE INVENTION

Briefly and in general terms, the present invention provides for a universal modular ducting apparatus for chilled aircraft galleys, that can be used to chill either air over or air through carts, that has a reduced cross-section, and that has primary duct assemblies that are modular, and can be formed from sectional vacuum formed plastic components, or master molds that can be reconfigured to create production tools for fiberglass or carbon fiber reinforced prepreg moldings. The supply and return airflow may be individually balanced for each cart bay using plate restrictors in either air over or air through configurations, and the ducts may have integral insulation.

The present invention accordingly provides for a universal modular ducting apparatus for chilled aircraft galleys including an aircraft galley ductwork assembly for chilling one or more aircraft galley food carts in one or more chilled galley food cart bays from a chiller unit. The universal modular ducting apparatus includes a chiller supply air duct assembly configured to supply a chilled supply airflow to the one or more aircraft galley food carts. In a presently preferred aspect, the chiller supply air duct assembly includes a chiller supply air duct lower portion having a chiller supply air inlet port configured to receive the chilled supply airflow from a chiller unit, and a chiller supply air duct upper portion having one or more chiller supply air duct outlet ports each including an outlet port connection adapter configured to connect the one or more chiller supply air duct outlet ports to the one or more aircraft galley food carts. The chiller supply air duct assembly also preferably includes a chiller return air duct assembly configured to deliver a return airflow from the one or more aircraft galley food carts. In a presently preferred aspect, the chiller return air duct assembly includes a chiller return air duct upper portion having at least one chiller return air inlet port configured to receive a return airflow from the one or more aircraft galley food carts, and a chiller return air duct lower portion having a chiller return air outlet port configured to deliver the return airflow to the chiller unit for cooling of the airflow.

In a presently preferred aspect, the chiller supply air duct assembly and the chiller return air duct assembly are internally insulated. In a presently preferred aspect, the chiller supply air duct assembly and the chiller return air duct assembly are modular. In a presently preferred aspect, the chiller supply air duct assembly and the chiller return air duct assembly optionally may be made from thermoformed plastic, a fibrous material preimpregnated with a synthetic resin, or prepreg, or a carbon fiber reinforced composite, for example.

In one presently preferred aspect, the outlet port connection adapter is configured to connect the one or more chiller supply air duct outlet ports to an air through galley food cart. In another presently preferred aspect, the outlet port connection adapter is configured to connect the one or more chiller supply air duct outlet ports to an air over galley food cart.

In another presently preferred aspect, the chiller supply air duct lower portion is connected to the chiller supply air duct upper portion by a chiller supply air duct main connection adapter, and the chiller return air duct lower portion is connected to the chiller return air duct upper portion by a chiller return air duct main connection adapter. In another presently preferred aspect, the chiller supply air duct upper portion and the chiller return air duct upper portion overlap.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
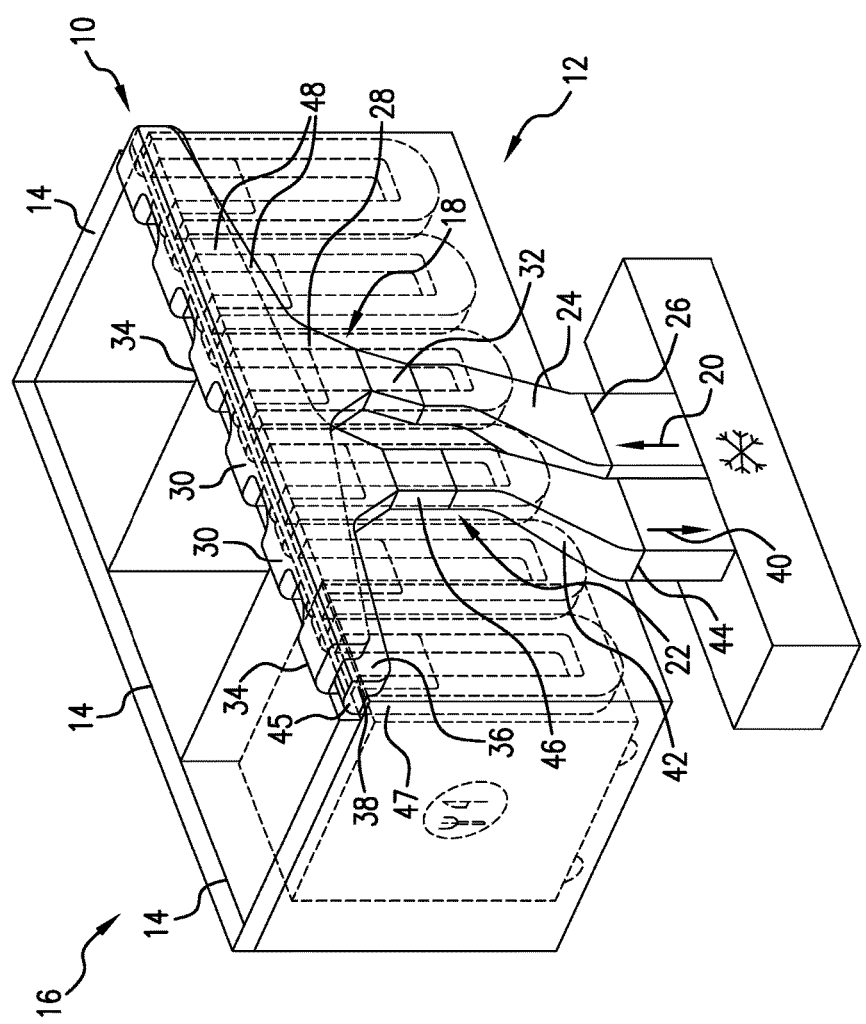
FIG. 1 is a schematic diagram illustrating a perspective view of a first embodiment of the universal modular ducting apparatus for chilled aircraft galleys for air through galley food carts according to the present invention.
Figure 2:
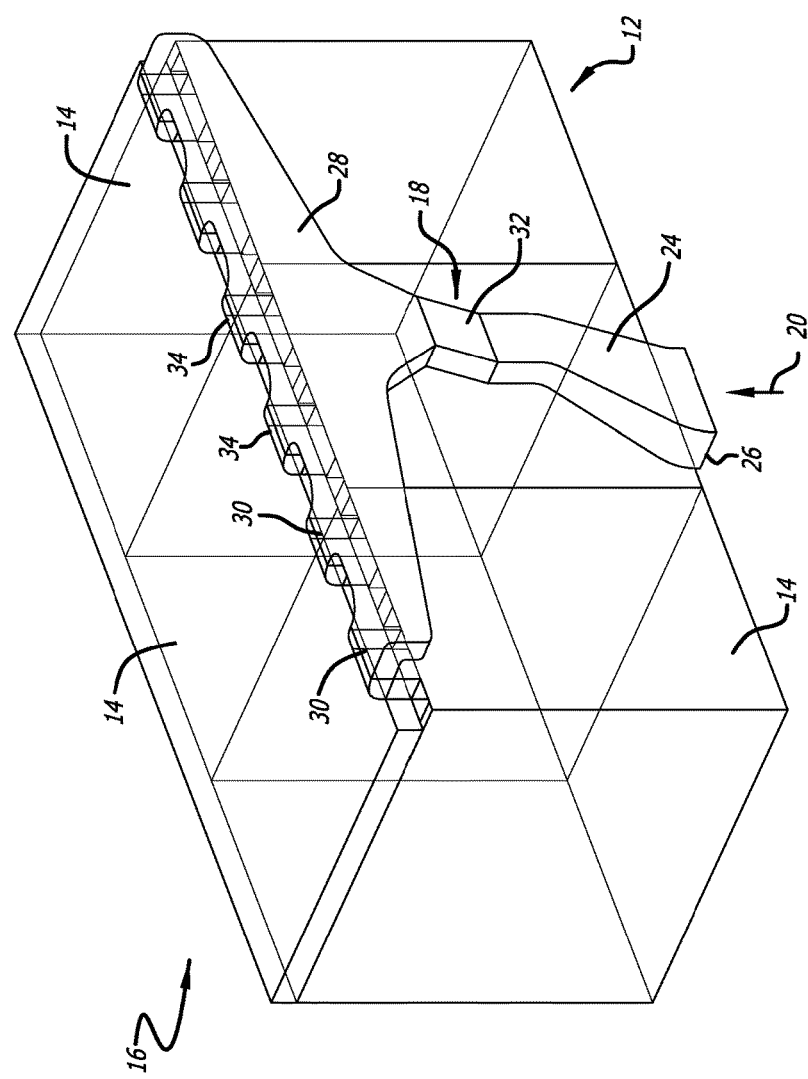
FIG. 2 is a schematic diagram illustrating a perspective view of the chilled air supply ducting of FIG. 1, omitting the chilled air return ducting for simplicity.
Figure 3:
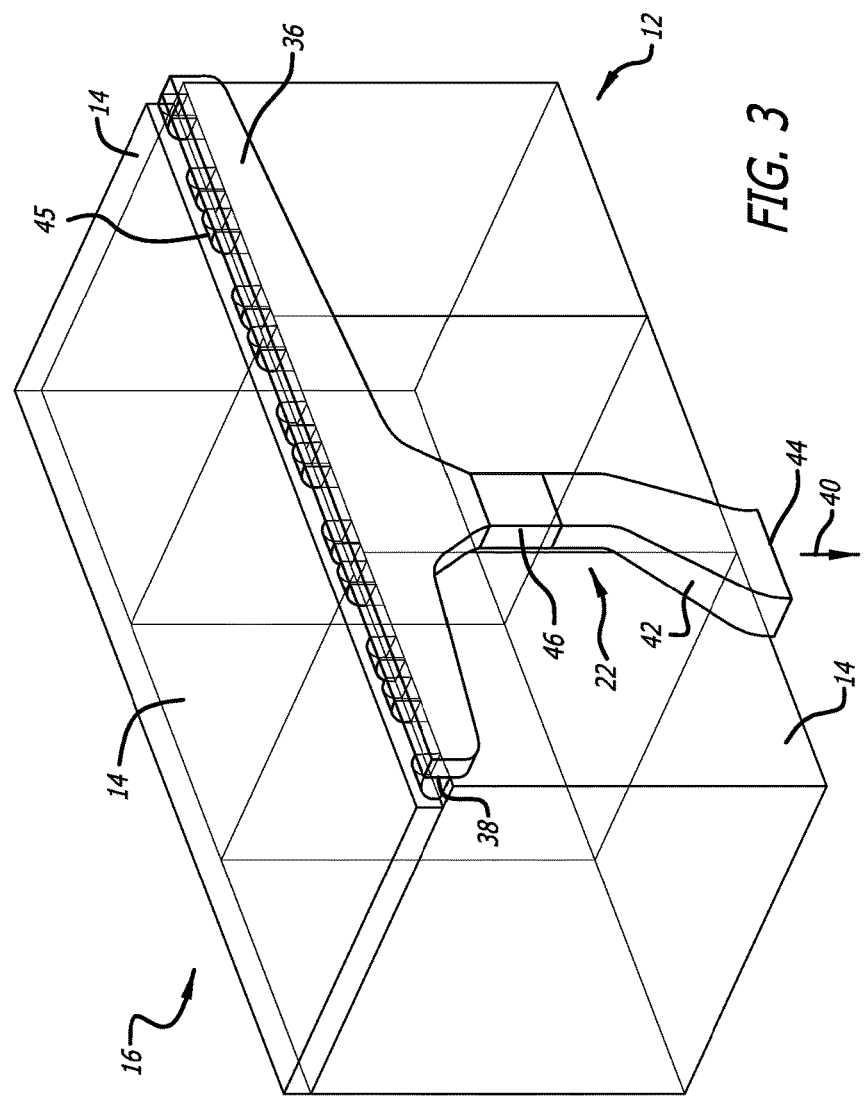
FIG. 3 is a schematic diagram illustrating a perspective view of the chilled air return ducting of FIG. 1, omitting the chilled air supply ducting for simplicity.

Referring to FIGS. 1-3, in a first presently preferred embodiment, the present invention provides for an aircraft galley ductwork assembly 10 typically provided at a rear side 12 of one or more chilled galley food cart bays 14 for cooling one or more aircraft galley food carts removably receivable at a front side 16 of the chilled galley food cart bays. The aircraft galley ductwork assembly includes a chiller supply air duct assembly 18 configured to supply a chilled supply airflow 20 to the corresponding aircraft galley food carts in the chilled galley food cart bays from a chiller unit, and a chiller return air duct assembly 22 configured to deliver a return airflow from the aircraft galley food carts in the chilled galley food cart bays to the chiller unit.

The chiller supply air duct assembly preferably includes a chiller supply air duct lower portion 24 having a chiller supply air inlet port 26 configured to receive the chilled supply airflow from the chiller unit, and a chiller supply air duct upper portion 28 having one or more chiller supply air duct outlet ports 30, best seen in FIG. 2. The chiller supply air duct lower portion is advantageously connected to the chiller supply air duct upper portion by a chiller supply air duct main connection adapter 32, as will be further explained below, and each of the one or more chiller supply air duct outlet ports preferably includes an outlet port connection adapter 34 configured to connect the one or more chiller supply air duct outlet ports to an air through galley food cart configuration, as is illustrated in FIGS. 1 and 2.

The chiller return air duct assembly includes a chiller return air duct upper portion 36 having one or more chiller return air inlet ports 38 configured to receive a return airflow 40 from the corresponding aircraft galley food carts, and a chiller return air duct lower portion 42 having a chiller return air outlet port 44 configured to deliver the return airflow to the chiller unit for cooling of the airflow. Each of the one or more chiller return air duct inlet ports preferably includes an inlet port connection adapter 45 configured to connect the one or more chiller return air duct inlet ports to an air through galley food cart configuration 47. The chiller return air duct lower portion is advantageously connected to the chiller return air duct upper portion by a chiller return air duct main connection adapter 46.

As is illustrated in FIG. 1, chiller supply air duct upper portion and the chiller return air duct upper portion preferably overlap in connecting with the one or more aircraft galley food carts in the chilled galley food cart bays, while the chiller supply air duct lower portion and the chiller return air duct lower portion are side by side, and at least one of the chiller supply air duct main connection adapter and the chiller return air duct main connection adapter is configured to extend at an oblique angle with respect to the other to allow the chiller supply air duct upper portion and the chiller return air duct upper portion to overlap.

In a presently preferred aspect, the chiller supply air duct assembly and the chiller return air duct assembly are internally insulated, such as with vacuum insulated panel, or a water impermeable flexible cellular foam fully or partially impregnated with a chemical agent, and that can further include a coating of another compatible material such as silicone, for example, to provide an insulated seal, for example. The chiller supply air duct assembly and the chiller return air duct assembly optionally may include modular sections 48, allowing cart configurations to be changed, and optionally may be made of thermoformed plastic, a fibrous material preimpregnated with a particular synthetic resin, or prepreg, or a carbon fiber reinforced composite (CFRC), for example.

Figure 4:
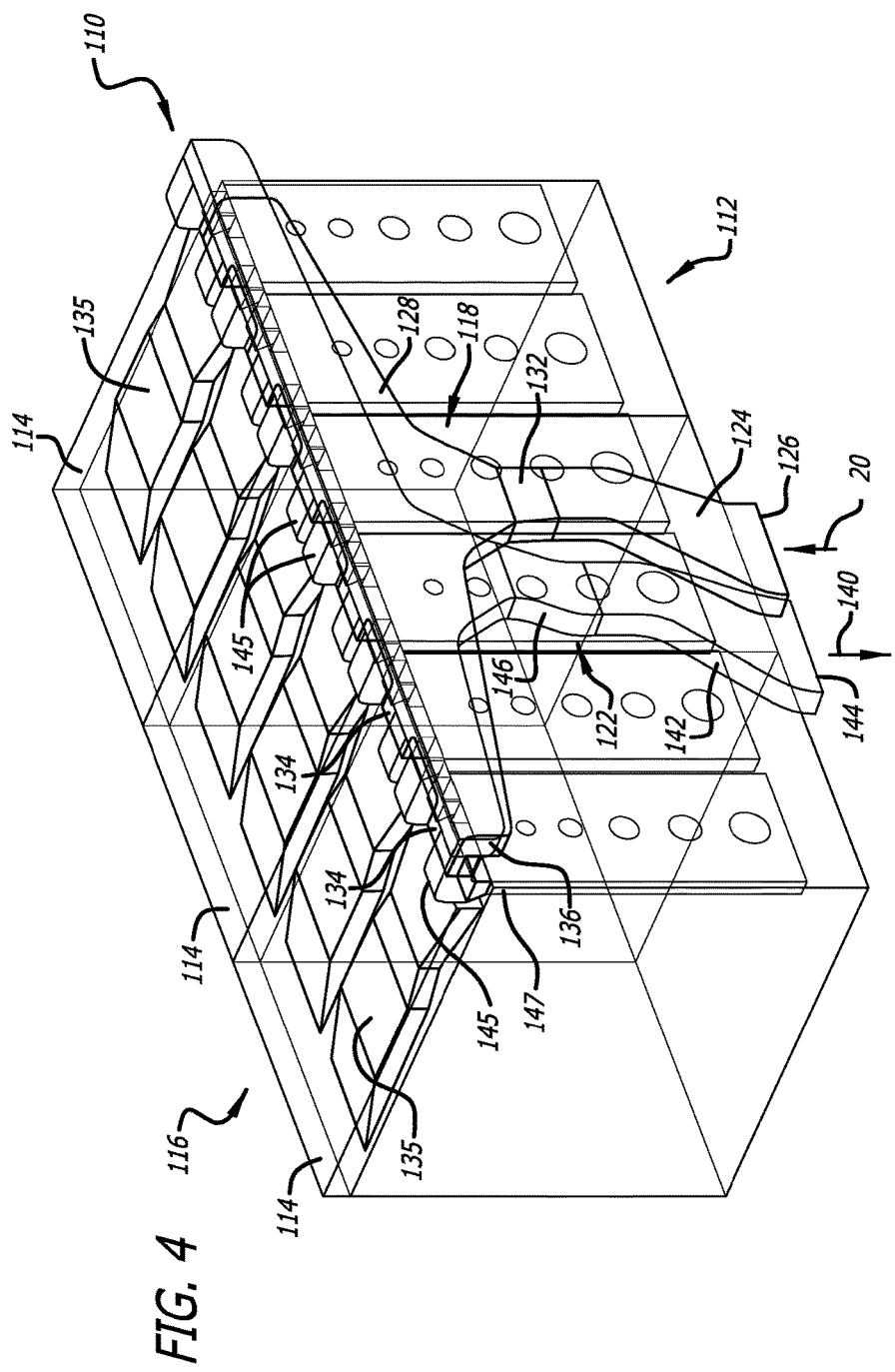
FIG. 4 is a schematic diagram illustrating a perspective view of a second embodiment of the universal modular ducting apparatus for chilled aircraft galleys for air over galley food carts according to the present invention.
Figure 5:
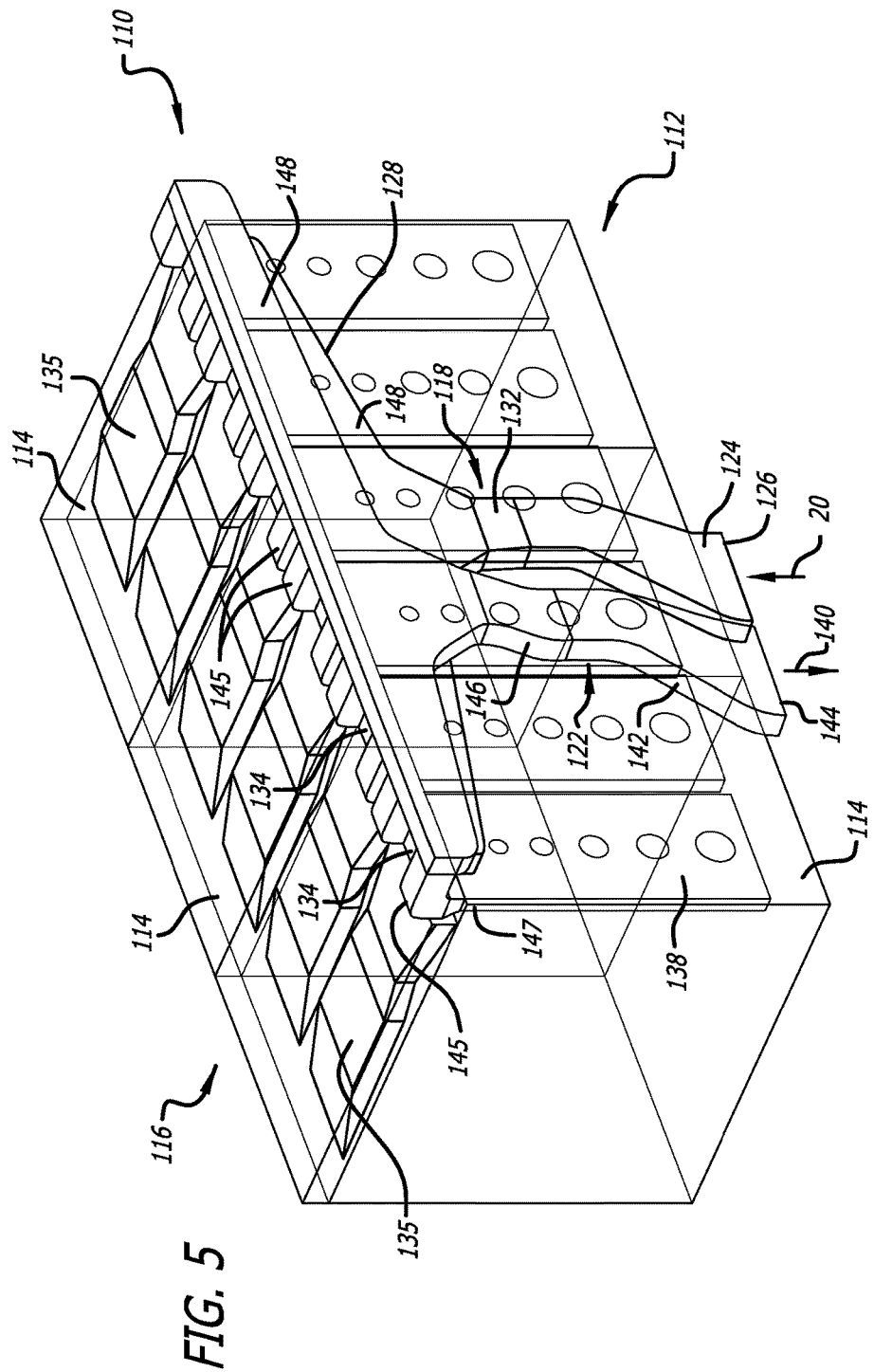
FIG. 5 is a schematic diagram illustrating a simplified perspective view of the chilled air supply and air return ducting of FIG. 4.
Figure 6:
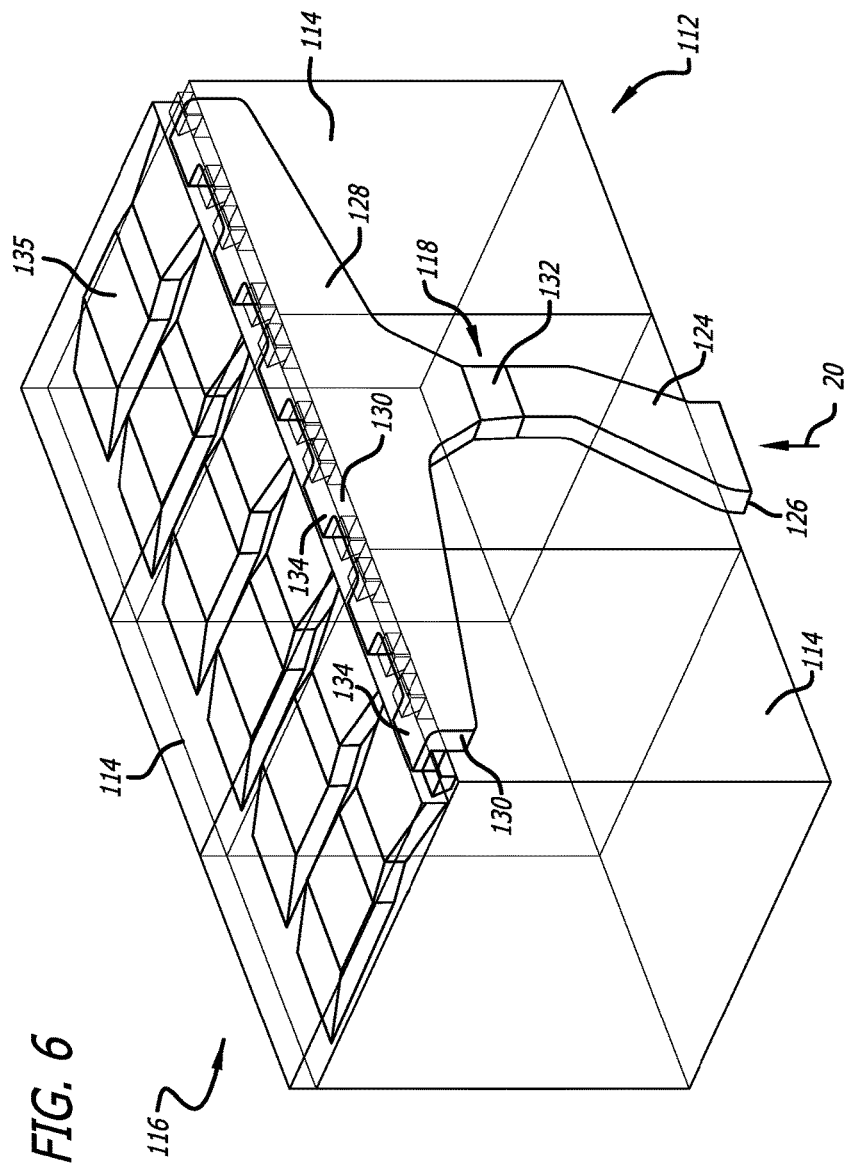
FIG. 6 is a schematic diagram illustrating a perspective view of the chilled air supply ducting of FIG. 4, omitting the chilled air return ducting for simplicity.

Referring to FIGS. 4-6, in a second presently preferred embodiment, the present invention provides for an aircraft galley ductwork assembly 110 typically provided at a rear side 112 of one or more chilled galley food cart bays 114 for cooling one or more aircraft galley food carts (not shown) removably receivable at a front side 116 of the chilled galley food cart bays. The aircraft galley ductwork assembly includes a chiller supply air duct assembly 118 configured to supply a chilled supply airflow 20 to the corresponding aircraft galley food carts in the chilled galley food cart bays from a chiller unit (not shown), and a chiller return air duct assembly 122 configured to deliver a return airflow from the aircraft galley food carts in the chilled galley food cart bays to the chiller unit.

The chiller supply air duct assembly includes a chiller supply air duct lower portion 124 having a chiller supply air inlet port 126 configured to receive the chilled supply airflow from the chiller unit, and a chiller supply air duct upper portion 128 having one or more chiller supply air duct outlet ports 130, best seen in FIG. 6. The chiller supply air duct lower portion is advantageously connected to the chiller supply air duct upper portion by a chiller supply air duct main connection adapter 132, as will be further explained below, and each of the one or more chiller supply air duct outlet ports preferably includes an outlet port connection adapter 134 configured to be connected between the one or more chiller supply air duct outlet ports an air over galley food cart ducts 135 for an air over galley food cart configuration, as is illustrated in FIGS. 4-6.

The chiller return air duct assembly includes a chiller return air duct upper portion 136 having one or more chiller return air inlet ports 138, best seen in FIG. 5, configured to receive a return airflow 140 from the corresponding aircraft galley food carts, and a chiller return air duct lower portion 142 having a chiller return air outlet port 144 configured to deliver the return airflow to the chiller unit for cooling of the airflow. Each of the one or more chiller return air duct inlet ports preferably includes an inlet port connection adapter 145 configured to connect the one or more chiller return air duct inlet ports to an air through galley food cart configuration 147. The chiller return air duct lower portion is advantageously connected to the chiller return air duct upper portion by a chiller return air duct main connection adapter 146. As is illustrated in FIG. 4, chiller supply air duct upper portion and the chiller return air duct upper portion overlap in connecting with the one or more aircraft galley food carts in the chilled galley food cart bays, while the chiller supply air duct lower portion and the chiller return air duct lower portion are side by side, and at least one of the chiller supply air duct main connection adapter and the chiller return air duct main connection adapter is configured to extend at an oblique angle with respect to the other to allow the chiller supply air duct upper portion and the chiller return air duct upper portion to overlap.

In a presently preferred aspect, the chiller supply air duct assembly and the chiller return air duct assembly are internally insulated, such as with vacuum insulated panel, or a water impermeable flexible cellular foam fully or partially impregnated with a chemical agent, and that can further include a coating of another compatible material such as silicone, for example, to provide an insulated seal, for example. The chiller supply air duct assembly and the chiller return air duct assembly optionally may include modular sections 148, allowing cart configurations to be changed, and optionally may be made of thermoformed plastic, a fibrous material preimpregnated with a particular synthetic resin, or prepreg, or a carbon fiber reinforced composite (CFRC), for example.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A universal modular ducting apparatus for chilled aircraft galleys including an aircraft galley ductwork assembly for chilling at least one aircraft galley food cart in at least one chilled galley food cart bay from a chiller unit, comprising:
    a chiller supply air duct assembly configured to supply a chilled supply airflow to at least one aircraft galley food cart, said chiller supply air duct assembly including a chiller supply air duct lower portion having a chiller supply air inlet port configured to receive the chilled supply airflow from a chiller unit, a chiller supply air duct upper portion having chiller supply air duct outlet ports, each of said chiller supply air duct outlet ports including an outlet port connection adapter configured to connect a corresponding chiller supply air duct outlet port to said at least one aircraft galley food cart; and
    a chiller return air duct assembly configured to deliver a return airflow from said at least one aircraft galley food cart, said chiller return air duct assembly including a chiller return air duct upper portion having chiller return air inlet ports configured to receive the return airflow from said at least one aircraft galley food cart, each of said chiller return air duct inlet ports including an inlet port connection adapter configured to connect a corresponding chiller return air duct inlet port to said at least one aircraft galley food cart, and a chiller return air duct lower portion having a chiller return air outlet port configured to deliver the return airflow to the chiller unit for cooling of the airflow;
    wherein said chiller supply air duct lower portion is releasably connected to said chiller supply air duct upper portion by a chiller supply air duct main connection adapter;
    wherein the chiller supply air duct assembly includes interchangeable modular sections configured to interchangeably accommodate an air through galley food cart configuration or an air over galley food cart configuration;
    wherein the chiller return air duct assembly includes interchangeable modular sections configured to interchangeably accommodate the air through galley food cart configuration or the air over galley food cart configuration,
    wherein the chiller supply air duct outlet ports are configured to supply the chilled supply airflow to at least one upper portion of said at least one aircraft galley food cart,
    wherein the chiller return air duct inlet ports are configured to receive the return airflow from the at least one upper portion of said at least one aircraft galley food cart.

2. The universal modular ducting apparatus of claim 1, wherein said chiller supply air duct assembly and said chiller return air duct assembly are internally insulated.

3. The universal modular ducting apparatus of claim 1, wherein said chiller supply air duct assembly and said chiller return air duct assembly are modular.

4. The universal modular ducting apparatus of claim 1, wherein said chiller supply air duct assembly and said chiller return air duct assembly are made of thermoformed plastic.

5. The universal modular ducting apparatus of claim 1, wherein said chiller supply air duct assembly and said chiller return air duct assembly are made of a fibrous material preimpregnated with a synthetic resin.

6. The universal modular ducting apparatus of claim 1, wherein said chiller supply air duct assembly and said chiller return air duct assembly are made of a carbon fiber reinforced composite.

7. The universal modular ducting apparatus of claim 1, wherein each of said outlet port connection adapter is configured to connect a corresponding chiller supply air duct outlet port to an air through galley food cart.

8. The universal modular ducting apparatus of claim 1, wherein each of said outlet port connection adapter is configured to connect a corresponding chiller supply air duct outlet port to an air over galley food cart.

9. The universal modular ducting apparatus of claim 1, wherein said chiller return air duct lower portion is releasably connected to said chiller return air duct upper portion by a chiller return air duct main connection adapter.

10. The universal modular ducting apparatus of claim 1, wherein said chiller supply air duct upper portion and said chiller return air duct upper portion overlap.

11. A universal modular ducting apparatus for chilled aircraft galleys, comprising:
    at least one chilled galley food cart bay for cooling a plurality of aircraft galley food carts removably receivable at a front side of said at least one chilled galley food cart bay; and
    an aircraft galley ductwork assembly disposed at a rear side of said at least one chilled galley food cart bay, said aircraft galley ductwork assembly including
        a chiller supply air duct assembly configured to supply a chilled supply airflow to said plurality of aircraft galley food carts from a chiller unit, said chiller supply air duct assembly including
            a chiller supply air duct lower portion having a chiller supply air inlet port configured to receive the chilled supply airflow from the chiller unit, and
            a chiller supply air duct upper portion having a plurality of chiller supply air duct outlet ports each including an outlet port connection adapter configured to connect said plurality of chiller supply air duct outlet ports to said plurality of aircraft galley food carts, and
        a chiller return air duct assembly configured to deliver a return airflow from said plurality of aircraft galley food carts to the chiller unit, said chiller return air duct assembly including
            a chiller return air duct upper portion having a plurality of chiller return air inlet ports configured to receive the return airflow from the said plurality of aircraft galley food carts, each of said plurality of chiller return air inlet ports including an inlet port connection adapter configured to connect said plurality of chiller return air inlet ports to said plurality of aircraft galley food carts, and a chiller return air duct lower portion having a chiller return air outlet port configured to deliver the return airflow to the chiller unit for cooling of the airflow, wherein said chiller return air duct lower portion is releasably connected to the chiller return air duct upper portion by a chiller return air duct main connection adapter;

wherein said chiller supply air duct upper portion and the chiller return air duct upper portion overlap in connecting with said plurality of aircraft galley food carts in the chilled galley food cart bays, and said chiller supply air duct lower portion and the chiller return air duct lower portion are positioned side by side;

wherein the chiller supply air duct assembly includes interchangeable modular sections configured to interchangeably accommodate an air through galley food cart configuration or an air over galley food cart configuration;

wherein the chiller return air duct assembly includes interchangeable modular sections configured to interchangeably accommodate the air through galley food cart configuration or the air over galley food cart configuration, wherein the plurality of chiller supply air duct outlet ports are configured to supply the chilled supply airflow to upper portions of said plurality of aircraft galley food carts, wherein the plurality of chiller return air inlet ports are configured to receive the return airflow from the upper portions of said plurality of aircraft galley food carts.

12. The universal modular ducting apparatus of claim 11, wherein said chiller supply air duct assembly and said chiller return air duct assembly are internally insulated.

13. The universal modular ducting apparatus of claim 11, wherein said chiller supply air duct assembly and said chiller return air duct assembly are modular.

14. The universal modular ducting apparatus of claim 11, wherein said chiller supply air duct assembly and said chiller return air duct assembly are made of thermoformed plastic.

15. The universal modular ducting apparatus of claim 11, wherein said chiller supply air duct assembly and said chiller return air duct assembly are made of a fibrous material preimpregnated with a synthetic resin.

16. The universal modular ducting apparatus of claim 11, wherein said chiller supply air duct assembly and said chiller return air duct assembly are made of a carbon fiber reinforced composite.

17. The universal modular ducting apparatus of claim 11, wherein said outlet port connection adapter is configured to connect said plurality of chiller supply air duct outlet ports to a plurality of air through galley food carts.

18. The universal modular ducting apparatus of claim 11, wherein said outlet port connection adapter is configured to connect said plurality of chiller supply air duct outlet ports to a plurality of air over galley food carts.

19. The universal modular ducting apparatus of claim 11, wherein;

said chiller supply air duct lower portion is releasably connected to the chiller supply air duct upper portion by a chiller supply air duct main connection adapter: and said chiller supply air duct main connection adapter is configured to extend at an oblique angle with respect to said chiller return air duct main connection adapter to allow the chiller supply air duct upper portion and the chiller return air duct upper portion to overlap.

20. The universal modular ducting apparatus of claim 11, wherein said chiller return air duct main connection adapter is configured to extend at an oblique angle with respect to said chiller supply air duct main connection adapter to allow the chiller supply air duct upper portion and the chiller return air duct upper portion to overlap.

* * * * *